June 8, 1937.  J. V. GIESLER ET AL  2,082,883
TEMPERATURE CONTROL MECHANISM FOR HEATING SYSTEMS
Filed Dec. 6, 1933
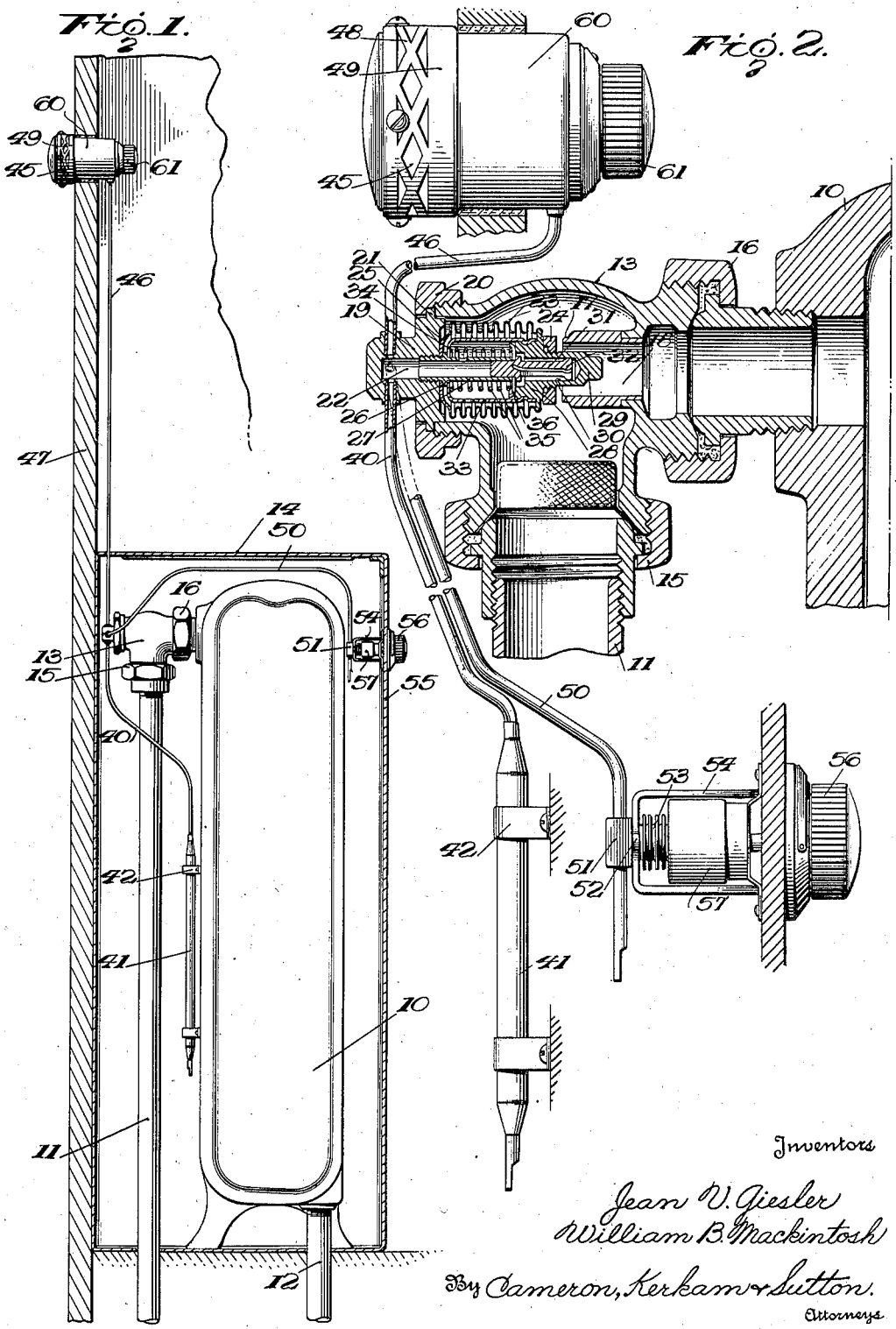
Inventors
Jean V. Giesler
William B. Mackintosh
By Cameron, Kerkam & Sutton
Attorneys Patented June 8, 1937

2,082,883

UNITED STATES PATENT OFFICE 2,082,883

TEMPERATURE CONTROL MECHANISM FOR HEATING SYSTEMS

Jean V. Giesler, Knoxville, Tenn., and William B. Mackintosh, Youngwood, Pa., assignors to The Fulton Sylphon Company, Knoxville, Tenn., a corporation of Delaware Application December 6, 1933, Serial No. 701,224

2 Claims. (Cl. 236—91)

This invention relates to temperature control mechanism for heating systems, and more particularly to mechanism for actuating the device that controls the flow of heating medium so that said flow is properly proportioned with regard to variations in the outdoor temperature as well as in the indoor temperature.

In thermostatically controlled valve operating mechanism, as for house heating radiators, the extent of valve opening varies with the temperature at the thermostat. For example, assume that the operating range of the thermostat is from 70° F. to 65° F., and that the valve has a total lift of 5/64 of an inch (in practice the range runs generally from 5° F. to 20° F. and the valve opening from 1/64 inch to 1/16 inch per degree F. change in temperature, depending on the size and requirements of the installation). A drop in temperature at the thermostat from 70° F. to 69° F. will result in the valve being opened 1/64 inch; if the temperature drops to 68° F., the valve is opened 2/64 inch; therefore, a 5/64 inch valve opening is not effected until the temperature has dropped to 65° F. Under normal operating conditions in cold weather (disregarding, for example, the conditions existing when a cold room is to be brought up quickly to a desired operating temperature), the transference of heat from the radiator or other heating element must vary with the rate of heat dissipation from the room or other compartment being heated if a straight-line temperature control is to be effected; as is well understood, however, the rate of heat dissipation varies with the differential between the inside and the outside temperatures, in other words, the lower the outside temperature, the greater the heat loss from the room or other compartment being heated. Therefore, the supply of heat at the radiator should increase as the outside temperature decreases, but an increased supply of heat at the radiator can only be obtained by an increased valve opening, and an increased valve opening can only be obtained by a decrease in the temperature of the room. Hence, the controlling temperature of the room is depressed from 70° F. to 65° F. under the facts assumed if the rate of heat dissipation is such as to require a full valve opening.

In order that the heat supply shall be modified by variations in outside temperature, various devices and systems have heretofore been proposed for varying the temperature of the heating medium with changes in the outdoor temperature. For example, it has been proposed to control the heat generator by a compound thermostatic system comprising elements subjected to the temperature of the heating medium and of the outside temperature; in vacuum systems it has been proposed to decrease the vacuum as the outside temperature decreases and thereby raise the temperature of the heating medium; it has also been proposed to vary the effectiveness or power of an inside thermostat with changes in the outside temperature. Devices of this character have sometimes included separate thermostats operating to effect the control by the algebraic sum of their movements, and sometimes two or more bulbs are in communication with a single motor element to constitute a compound thermostat operable by differential expansion of the contained fluid, but with the exception of damper operators these devices have generally involved complex electrical and relay systems.

Devices of the type characterized are open to a wide variety of objections, as well understood in the art, among which may be noted the complexity involved when relay or electrical systems are employed, the time lag or lack of sensitivity in prompt response to variations of temperature, the lack of control individual to varying rates of heat dissipation from different rooms, etc.

It is an object of this invention to provide a temperature regulating mechanism for heating systems which operates on the means that regulates the flow of the heating medium so as to obtain a substantially straight-line temperature control.

Another object of this invention is to provide a device of the type characterized which is wholly mechanical in its construction, thereby avoiding the difficulties and complexities introduced by the use of electrical and relay systems.

Another object of this invention is to provide a device of the type characterized which directly controls the means controlling the flow of heating medium, thereby avoiding the difficulties and complexities necessarily involved in systems that require the interposition of one or more relays between the controlling and the controlled elements.

Another object of this invention is to provide a device of the type characterized which may be used to modify the action of the heating element in each room in conformity with the needs peculiar to the rate of heat dissipation therefrom.

Another object of this invention is to provide a device of the type characterized which may be readily adjusted to meet the conditions of each installation.

Another object of this invention is to provide a device of the type characterized which is simple in construction, sensitive in operation, easy to manufacture and install, durable and efficient.

Other objects will appear as the description of the invention proceeds.

The invention is capable of receiving a variety of mechanical expressions, one of which is illustrated on the accompanying drawing, but it is to be expressly understood that the drawing is for the purpose of illustration only and is not to be construed as a definition of the limits of the invention, reference being had to the appended claims for that purpose.

Referring in detail to the accompanying drawing wherein the same reference characters indicate corresponding parts in the several figures, Fig. 1 is a schematic elevation illustrating a temperature controlling mechanism which embodies the present invention;

Fig. 2 is an enlarged view, partly in section, of the major elements of the mechanism but with the structure of the separate parts thereof moved out of their proper relative position in the interest of compactness.

Stated broadly, the present invention involves a controlling device for the flow of heating medium, illustrated as a radiator valve although it is to be expressly understood that any other suitable heating device and controlling means therefor may be used in place thereof; means for operating said controlling device and preferably taking the form of a motor vessel subjected to a source of heat for effecting volatilization of a liquid injected thereinto to develop the effective operating pressures; means subjected to the outside temperature and controlling said operating means so that as the exterior temperature decreases the response at said operating means is such that the flow of heating means is adequate to compensate for the increased rate of heat dissipation from the room or other compartment being heated; and means inside the room or other compartment being heated and which may be placed in any suitable location in order that it may properly respond to variations in the temperature of said room or other compartment for adjusting said operating means in conformity with fluctuations in the inside temperature. As the compensating action of the outside thermostat should vary with the range of the outside temperature, the mechanism also preferably includes means whereby the mechanism may be adjusted to function in conformity with the rate of heat dissipation encountered at the place of installation.

Referring now to the embodiment of the invention illustrated on the drawing, 10 designates a source of heat in the form of a conventional house heating radiator, said radiator being provided with a suitable inlet pipe 11 and a suitable outlet pipe 12. Interposed in the inlet pipe 11 adjacent the radiator 10 is a valve casing 13 containing an automatically operated valve as hereinafter described. As shown, the radiator 10 is enclosed within a housing 14 having suitable openings in the walls thereof so that air from the room will circulate into and out of said housing and extract heat from the radiator in a manner well understood in the art.

Referring now to Fig. 2, the valve casing 13 is shown as connected to the inlet pipe 11 by a coupling 15 and to the radiator 10 by a tailpiece and tail nut 16. Interiorly, said valve casing 13 is provided with a valve seat 17 of any suitable character and construction and surrounding a valve port 18 through which the heating medium may flow from the inlet pipe 11 to the radiator 10. Mounted in an opening in the valve casing 13, and in alinement with the valve seat 17, is a member 19 suitably retained on the casing 13 as by a ring nut 20 engaging a flange 21 on the member 19. Member 19 has interiorly thereof a chamber 22 for purposes hereinafter explained.

Member 19 carries an expansible and collapsible motor vessel 23 to which is suitably attached a valve member 24 for cooperation with the valve seat 17. As shown, said vessel 23 is in the form of an expansible and collapsible tubular corrugated member or bellows, having its stationary end wall 25 clamped to the inner face of the member 19, as by a flange 26 on a tubular member 27 threaded into the aperture at the open end of the chamber 22. The opposite end of the bellows member 23 is attached in any suitable way, as by brazing or soldering, to a flange on a movable end wall or end member 28 which has an elongated central boss 29 threaded to receive the valve member 24. Boss 29 has an interior tubular bore 30 which cooperates with a guide post 31, preferably provided with an enlarged spherical extremity 32 that has an exterior diameter corresponding with the interior diameter of said bore 30. The member 31 is carried by the tubular member 27 and constitutes a guide for limiting the member 28 to rectilinear movements, the spherical extremity 32 of the guide member 31, however, permitting some movement of the valve member to effect a proper seating thereof on the valve seat 17.

In order that the motor vessel 23 shall normally be urged toward its contracted position with the valve member 24 in its position of maximum opening, end member 28 has suitably attached thereto a tubular element 33 having an inwardly directed flange 34 at its outer end. A coil spring 35 reacts between said flange 34 and a stationary spring seat 36, here shown as clamped between the tubular member 27 and a flange on the guide member 31. The coil spring 35 normally urges the flange 34 and the end member 28 attached thereto by tubular member 33 toward the left as viewed in Fig. 2, and collapses the bellows 23 to the maximum extent permitted by the engagement of flange 34 with flange 26, in which position the valve member 24 has its maximum opening.

The motor vessel 23 is subjected to the temperature of the heating medium flowing through the valve casing 13, and therefore constitutes a hot vessel in which a vaporizable liquid may be vaporized to effect an extension of said vessel 23 and reduce the valve opening or close the valve. The chamber 22 in the member 19 communicates with the interior of said vessel 23 through suitable apertures in the tubular members 27 and 33.

Communicating with said chamber 22 is a conduit 40 of any suitable size, length and material, and which may be either rigid or flexible, said conduit leading to a reservoir or bulb 41 containing a vaporizable liquid and subjected to the inside temperature at any suitable point of control, so that upon a predetermined rise in the inside temperature the liquid in bulb 41 will expand and effect an injection of said liquid into the motor vessel 23, thereby causing an expansion of the motor vessel 23 and the movement of the valve member toward closed position. As shown, bulb 41 is mounted by suitable brackets 42 on the rear of the radiator 10 in the path of the air that is drawn over the radiator by convection currents set up in the housing 14, the bulb 41 thereby being subjected to the temperature of the air that is drawn in from the room and rising through the radiator to extract heat therefrom.

In conformity with the present invention, the chamber 22 is also in communication with a second bulb or vessel 45 through a conduit 46 which may be of the same character as the conduit 40. The bulb 45 is exposed to the outdoor temperature and, as shown, is contained within a suitable receptacle 49 mounted in an outside wall 47, said receptacle surrounding the bulb and constituting a protecting casing therefor but having suitable openings 48 therein so that the outside air may circulate over said bulb 45 and impart its temperature thereto. The bulb 45 is also filled with the same volatile liquid as that in bulb 41, and said bulb cooperates with bulb 41 to predetermine the pressure in the motor vessel 23 and compensate for the effects of outside temperature on the rate of heat dissipation from the room being heated.

As the compensating action of the bulb 45 should vary with the range of the outside temperature to be encountered, means are preferably provided for adjusting the mechanism so far described. Communicating with the chamber 22 or some suitable part of the system composed of bulb 41 and conduit 40 is a third conduit 50 which may be like conduits 40 and 46, and which leads to a coupling 51 in communication through a conduit 52 with an expansible and collapsible chamber 53 mounted by means of a bracket 54 at a convenient location, here shown as the front wall 55 of the radiator casing 14. Cooperating with the expansible and collapsible vessel 53 is a manually adjustable means of any suitable character for expanding and collapsing the same. While said adjusting means may be of any suitable construction, it is desirably of the character described and claimed in the application of Mackintosh, filed December 28, 1931, Serial No. 583,531, and including a manually operable knob 56 for rotating an interiorly threaded tubular member 57 having cooperative engagement with a member having a helical periphery mounted on the movable end wall of the vessel 53. The vessel 53 and its communicating conduit are also charged with the same volatile liquid that fills the bulbs 41 and 45, and therefore by varying the volume of vessel 53, the effective volume of volatile liquid responding to the fluctuations of temperature at the bulb 41 may be suitably varied, in other words, as more or less of said liquid exists in tube 40 by reason of adjustment of vessel 53 less or more expansion of said liquid is required at bulb 41 respectively to produce a predetermined injection of said liquid into motor vessel 23.

As the effective volume of liquid responsive to changes in temperature at the bulb 45 should be varied in inverse proportion to the changes in the effective volume of the liquid responsive to the changes in temperature at the bulb 41, bulb 45 is also provided with an adjusting mechanism enclosed in a casing 60 and having a manually operable knob 61, said adjustable means preferably being of the same construction as the adjusting mechanism operated by the knob 56. Adjusting mechanisms 55 and 61 are preferably provided with suitable indicating devices so that they may be readily adjusted by proportionate amounts to the end that the effective volume of liquid responsive to the outside temperature may be increased to the same amount as the volume of liquid responsive to the inside temperature is decreased, and vice versa.

The bulbs 41 and 45 and communicating conduits are each charged with a sufficient quantity of vaporizable liquid so that any increase in temperature above a predetermined degree, say 70° F. for example, will effect such an injection of the liquid into the motor vessel 23, to be volatilized therein, as by the increased pressure in said vessel will move the valve member 24 to its seat. Conversely, a decrease in temperature at either bulb causes a contraction of the liquid, the withdrawal of the liquid further into the communicating tube, and a progressive condensation of the vapor in said tube, effecting a corresponding diminution in the pressure in the vessel 23. As bulbs 41 and 45 are both in communication with the same chamber 22, and therefore with each other, their effective actions are dependent.

Assume that the bulb 41 and the volume of liquid associated therewith is such that at 70° F. the pressure in vessel 23 causes valve 24 to close while at 65° F. the valve is wide open; also assume that the minimum outside temperature at the particular location of installation is minus 10° F., i. e. a possible range of 80° below the temperature to be maintained. A change of 16° in outside temperature is therefore comparable to a change of 1° in inside temperature. Also assume that the rate of heat supply when the valve is in wide open position is just sufficient to compensate for heat dissipation when the outside temperature is minus 10° F. Under these circumstances, if the outside bulb 45 were not employed the requisite valve opening would be obtained only when the inside temperature had decreased to 65° F., 5° below that which it is desired to maintain. With the present invention, however, the outside temperature produces such a contraction of the liquid in the bulb 45 that the vessel 23 is maintained in its contracted position, with the valve 24 wide open, even though the inside temperature be 70°. Therefore, the 70° temperature is maintained by the wide open valve, and the heat supply is equal to the heat dissipation, and only in the event that the inside temperature starts to rise above 70° F. can expansion of liquid from the bulb 41 develop such a pressure in vessel 23 that the valve 24 is moved toward closing position.

In the next place, assume an intermediate temperature of say 30° F., due to a rise in outside temperature, as between early morning and early afternoon. The increase in outside temperature produces an expansion of the liquid in the bulb 45 so that the valve opening is reduced one half and the rate of flow of the heating medium now conforms with the rate of heat dissipation at the new outside temperature. Again the rate of supply is such as to maintain a 70° temperature within the room without necessitating the temperature in the room to first drop half way down the range of the inside thermostat as would otherwise be required where the compensation for heat dissipation can only be effected by the valve being half way open. Therefore, at any temperature below the designed operating temperature the outside thermostat predetermines an opening of the valve that is suitable for automatically compensating for the rate of heat dissipation from the room and the predetermined temperature is maintained in the room without need for the inside temperature dropping to such an amount as will effect that degree of opening of the valve that is requisite for the flow of heating medium compensating for the heat dissipation. At the same time, the inside thermostat is immediately effective to move the valve toward closed position if the supply of heat is such as to tend to raise the inside temperature above the predetermined degree, say 70° F., to be maintained, and conversely, if for any reason the inside temperature tends to drop below the predetermined temperature, a drop of 1° inside of the room is equivalent to a drop of 16° outdoors, so that an immediate and sensitive response at the valve is effected.

The control from the outside temperature predetermines a position of the valve that insures a flow of heating medium adequate to maintain the desired interior temperature, maintaining it so to speak at a critical position, and any fluctuation of the inside temperature above or below the predetermined temperature is immediately effective to produce a readjustment of the valve, thereby substantially eliminating lag and increasing sensitiveness in the response to fluctuations of inside temperature. Thus the difficulties heretofore experienced in maintaining a straight-line temperature control within the room or compartment are substantially eliminated. Also, inasmuch as the degree of valve opening is controlled by the outside temperature so long as the inside temperature does not rise above the predetermined degree under normal conditions of operation, and inasmuch as this effect is obtained mechanically and directly at the valve by a single valve operating member subjected to pressures which vary with the outside temperature as well as with the inside temperature, the difficulties and complexities heretofore experienced with the use of electrical systems, relay systems, etc., are substantially avoided. At the same time, the provision for adjustment enables the present invention to be standardized and yet readily adjusted to the proper conditions of operation in order to compensate for variations in the minimum outside temperatures or in the rates of heat dissipation from the room or other compartment being heated, because by properly varying the effective volumes of liquid responsive to the outside and inside temperatures their relative effects at the motor vessel 23 may be nicely adjusted so as to predetermine the relationship to be maintained. Furthermore, the device is simple in construction, easy to manufacture and install, economical of space, and readily available for rendering the control of each individual room or compartment independent of the control of other rooms or compartments.

While the embodiment of the invention illustrated on the drawing has been described with considerable particularity, it is to be expressly understood that the invention is not restricted thereto, as the same is capable of receiving a variety of mechanical expressions. The inside bulb may be disposed at other suitable locations; the character and form of the containers for the volatile liquid, both inside and outside, may be suitably changed to meet the requirements of different characters of installation; the means for varying the effective volumes of liquid may take a wide variety of constructions; and changes made in details of construction, arrangement, proportion, size and material without departing from the spirit of this invention. Reference is therefore to be had to the appended claims for a definition of said invention.

What is claimed is:—

1. In a temperature controlling mechanism for heating systems including a radiator, an inlet and an outlet conduit for said radiator, a cover for said radiator, and a valve in said inlet conduit to control the admission of the heating medium to said radiator, a motor element to operate said valve and subjected to the heat of the heating medium to vaporize a vaporizable fluid therein, a reservoir mounted on said radiator containing said vaporizable fluid, a conduit joining said reservoir and the interior of said motor element, a vessel with a manually adjustable volume filled with said vaporizable fluid mounted on said cover, a conduit joining said vessel and the interior of said motor element, a second vessel filled with said vaporizable fluid and having a manually adjustable volume subjected to outdoor temperature, and a conduit joining said second named vessel and the interior of said motor vessel whereby by manual adjustment of the volumes of said first named and said second named vessels more or less vaporizable fluid will be forced into the conduit joining said reservoir and the interior of said motor vessel by the action of the indoor and outdoor temperatures respectively and less or more temperature at said reservoir will be required to expand said vaporizable fluid and force it into said motor element to be vaporized by the heating medium to actuate said valve.

2. In a temperature controlling mechanism for heating systems including a radiator, an inlet and an outlet conduit for said radiator, a cover for said radiator, and a valve in one of said conduits to control the admission of the heating medium to said radiator, a motor element to operate said valve and subjected to the heat of the heating medium to vaporize a vaporizable fluid therein, a reservoir mounted to be responsive to the temperature of the space within said cover and containing said vaporizable fluid, a conduit joining said reservoir and the interior of said motor element, a vessel with a manually adjustable volume filled with said vaporizable fluid, a conduit joining said vessel and the interior of said motor element, a second vessel filled with said vaporizable fluid and having a manually adjustable volume subjected to outdoor temperature, and a conduit joining said second named vessel and the interior of said motor vessel, whereby by manual adjustment of the volumes of said first named and said second named vessels more or less vaporizable fluid will be forced into the conduit joining said reservoir and the interior of said motor vessel by the action of the indoor and outdoor temperatures respectively and less or more temperature at said reservoir will be required to expand said vaporizable fluid and force it into said motor element to be vaporized by the heating medium to actuate said valve.

JEAN V. GIESLER.
WILLIAM B. MACKINTOSH.